United States Patent

[11] 3,617,096

[72] Inventors: Frederick G. Grabb;
Keith H. Fulmer; Harold B. Schultz, all of South Bend, Ind.
[21] Appl. No. 32,018
[22] Filed Apr. 27, 1970
[45] Patented Nov. 2, 1971
[73] Assignee The Bendix Corporation

[54] AUXILIARY HYDRAULIC BRAKING SYSTEMS
11 Claims, 6 Drawing Figs.
[52] U.S. Cl. .................................................. 303/9, 303/2, 303/10, 303/13
[51] Int. Cl. ...................................................... B60t 13/04
[50] Field of Search ........................................... 303/2, 7, 9, 10, 13

[56] References Cited
UNITED STATES PATENTS

| | | | |
|---|---|---|---|
| 3,272,564 | 9/1966 | Romanini | 303/7 |
| 3,362,756 | 1/1968 | Brandon, Jr. | 303/13 |
| 3,459,226 | 8/1969 | Schultz | 303/10 X |
| 3,466,099 | 9/1969 | Schultz | 303/10 X |
| 3,469,890 | 9/1969 | Fulmer | 303/10 X |
| 3,524,683 | 8/1970 | Stelzer | 303/10 X |

Primary Examiner—Milton Buchler
Assistant Examiner—Stephen G. Kunin
Attorneys—W. N. Antonis and Plante, Hartz, Smith & Thompson ABSTRACT: A emergency and parking valve used in a dual full-power system that provides two means to hold off a spring brake. The emergency and parking valve, which contains two independent valves, may be actuated by one of two means. The first means is the parking brake lever and the second means is a pressure differential between each half of the dual full-power system. Because the spring brake is modulated, it may be used to give smooth emergency stops when the pressure differential is sensed. Pressurized fluid to hold off the spring brake is received from each half of the split system so that loss of pressure in one spring brake conduit will not cause an application of the spring brake unless pressure is lost in both spring brake conduits.

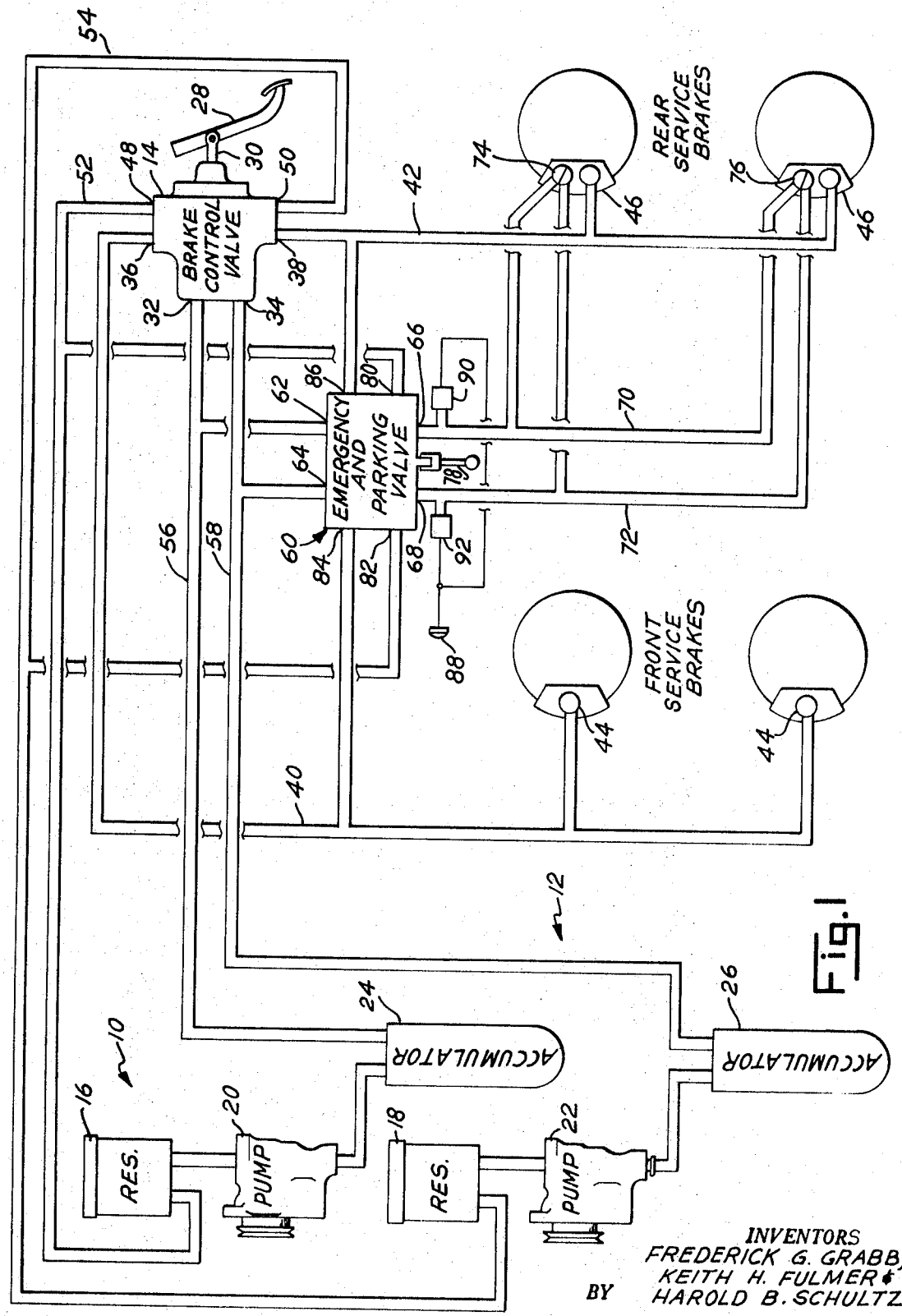

INVENTORS
FREDERICK G. GRABB,
KEITH H. FULMER
BY & HAROLD B. SCHULTZ
Plante, Arens, Hartz, Smith & Thompson
ATTORNEYS INVENTORS
FREDERICK G. GRABB,
KEITH H. FULMER &
BY HAROLD B. SCHULTZ
Planté, Arens, Hartz
Smith & Thompson
ATTORNEYS

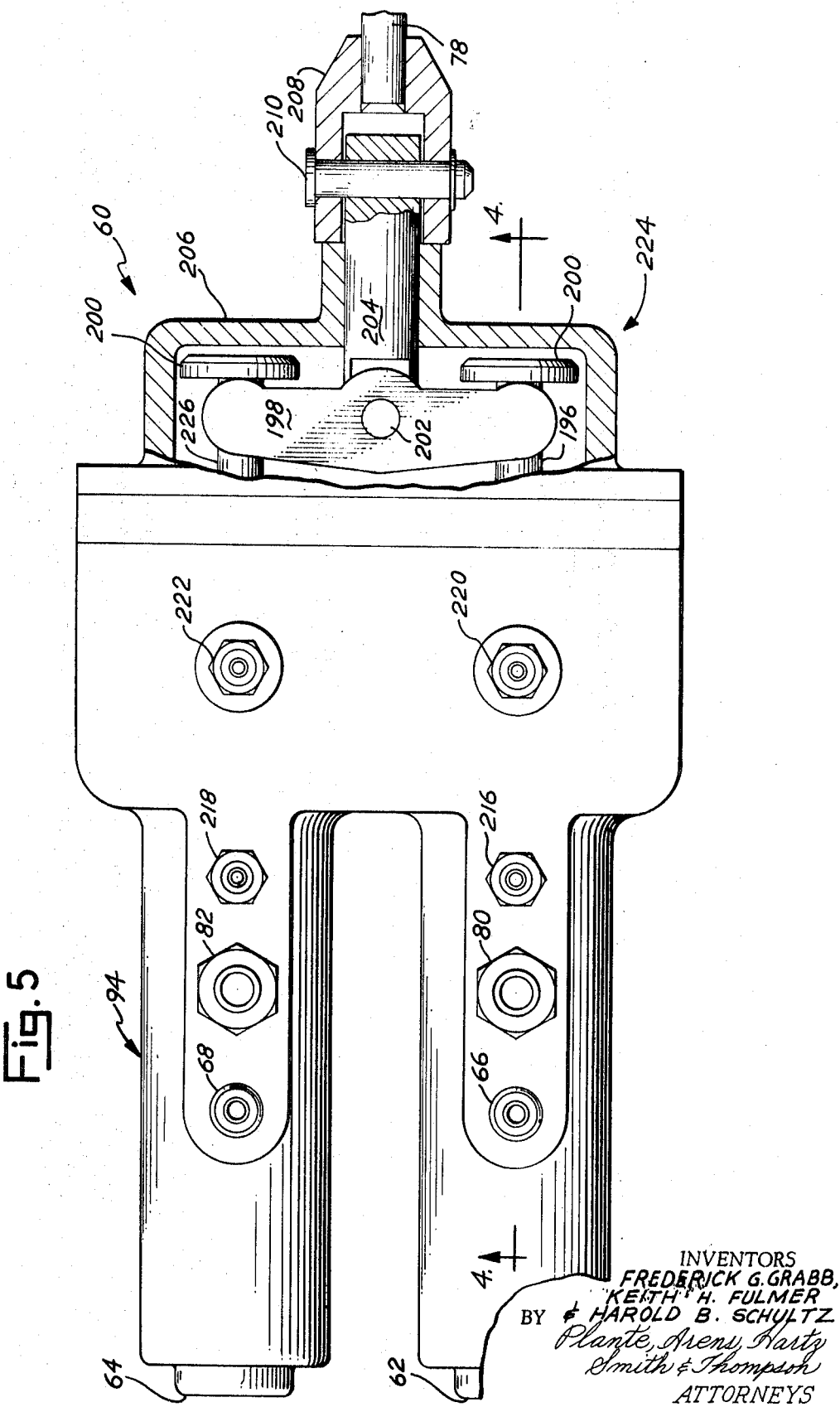

AUXILIARY HYDRAULIC BRAKING SYSTEMS

BACKGROUND OF THE INVENTION

When utilizing a spring brake as an emergency or parking brake, a loss of fluid pressure could cause a sudden application of the spring brake. In the prior art, only one means was shown to hold off a spring brake. Therefore, if a mechanical failure should cause loss of pressure, there would be a sudden application of the spring brakes. This could happen anytime during the operation of the vehicle, bringing the vehicle to a sudden and abrupt stop. Because of the danger due to sudden and unexpected stops caused by a loss of pressure in the spring brakes, this system was developed.

Previously dual-braking systems have been developed and used extensively in large trucks wherein a single application of the brake pedal will apply the brakes in each part of the dual-brake system. Because each portion of the dual system is totally independent, it is very simple to utilize the pressurized fluid in each system to provide two means to hold off a spring brake. A spring brake can be held off by a single piston with two layers as shown in U.S. Pat. application Ser. No. 797,530, filed Feb. 7, 1969, owned by the assignee of the present invention. Where pressurized fluid is realized in either layer of the piston, the spring brake will not be applied. The former full-power systems that used a spring brake as an emergency and parking brake only utilized one-half of the split full-power system as a means of controlling the spring brake.

SUMMARY OF THE INVENTION

Accordingly, it is an object of this invention to provide an emergency and parking brake system for use in a dual full-power system.

It is a further object of this invention to provide a split inversion and parking valve which has two independent means for controlling the hold-off pressure of the spring brake.

It is a still further object of this invention to provide two independent means for controlling an inversion and parking valve; the first means being an externally applied handbrake and the second means being a pressure differential between the first and second part of said dual full-power braking system.

It is an even further object of this invention to provide a complete dual full-power system including a dual emergency and parking brake valve with two independent means of controlling the spring brake; the spring brake being modulated so that the emergency and parking brake valve may partially apply a spring brake due to a pressure differential when applying the footbrake.

BRIEF DESCRIPTION OF THE DRAWINGS

FIG. 1 is a diagrammatical illustration of a dual full-power system utilizing a split parking and emergency brake controlled by the handbrake or a pressure differential.

FIG. 5 is the top view of the emergency and parking valve shown in FIG. 4 with a partial cross-sectional area to illustrate the yoke arrangement.

DESCRIPTION OF THE PREFERRED EMBODIMENT

Figure 3:
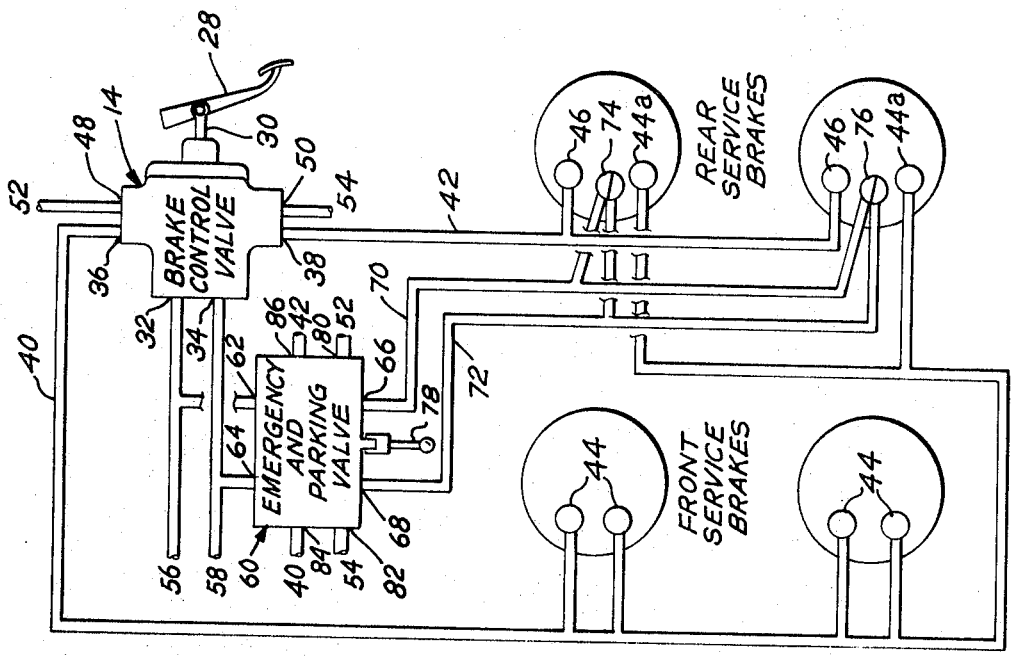
FIG. 3 is a partial diagrammatic illustration of a dual full-power system as shown in FIG. 1, except the brakes are split half axle by one and one-half axle.

Referring to FIG. 1, there is represented a dual full-power braking system with the front braking subsystem being represented generally by the reference numeral 10 and the rear braking subsystem being represented generally by the reference numeral 12. Each subsystem is totally independent of the other subsystem even though a common split brake control valve 14 is used. In each subsystem there is a reservoir 16 or 18 which contains hydraulic fluid supplied to the engine-driven pump 20 or 22, respectively. From the engine-driven pump 20 or 22 pressurized fluid is applied to the accumulators 24 or 26, respectively. From the accumulators 24 and 26 two independent sources of pressurized fluid are supplied to the split brake control valve 14.

Upon application of the brake pedal 28, plunger 30 operates the split brake control valve 14, whereby pressurized fluid received at ports 32 and 34 is supplied to brake ports 36 and 38, respectively. From brake ports 36 and 38 pressurized fluid is applied through brake conduits 40 and 42 to front service brakes 44 and rear service brakes 46, respectively. Upon release of the brake pedal 28, communication between pressure ports 32 and 34 with brake ports 36 and 38 is terminated and communication is established with return ports 48 and 50, respectively. Therefore, any pressurized fluid being applied to the front service brakes 44 or the rear service brakes 46 is returned through return conduits 52 and 54 to reservoirs 16 and 18, respectively.

Also connected to pressure conduits 56 and 58 of accumulators 24 and 26 is emergency and parking brake valve 60. When the vehicle is in operation, the pressure received at pressure point 62 and 64 is normally in communication with spring brake ports 66 and 68. Therefore, in normal operation of the vehicle with all parts functioning properly, a pressure is realized in spring brake conduits 70 and 72 whereby spring brakes 74 and 76 are held off by the pressurized fluid. Upon application of the parking brake lever 78, communication between pressure ports 60 and 62 and spring brake ports 66 and 68 is terminated and communication between spring brake ports 66 and 68 and return ports 80 and 82 is established whereby pressurized fluid used to hold off the spring brake is returned through return conduits 52 and 54 to reservoirs 16 and 18, respectively.

Now suppose, upon application of brake pedal 28, there is a pressure differential in brake conduits 40 and 42. The difference in pressure of the fluid being delivered to the front service brakes 44 and the rear service brakes 46 is sensed inside the emergency and parking valve 60 through front service brake port 84 and rear service brake port 86, whereby the pressure differential will actuate the emergency and parking brake valve 60. In the configuration shown in FIG. 1, the emergency and parking brake valve 60 will actuate when the pressure of the fluid delivered to the rear service brakes 46 is less than the pressure delivered to the front service brakes 44. However, it is possible to change the pressure differential arrangement by simply changing connections at the front service brake port 84 and the rear service brake port 86 so that the emergency and parking brake valve 60 will actuate when the pressure in rear service brakes 46 is greater than the pressure in the front service brakes 44.

Because the emergency and parking valve 60 is split into two independent halves, one half may not be working properly even though the other half continues to hold off spring brakes 74 and 76. Therefore, a low-pressure indicator 88 is electrically connected to low-pressure sensors 90 and 92 whereby a loss of pressure in either spring brake conduit 70 or spring brake conduit 72 will cause the low pressure indicator to light up. The low-pressure indicator will tell the operator of the vehicle if his emergency and parking brake is functioning properly.

Figure 2:
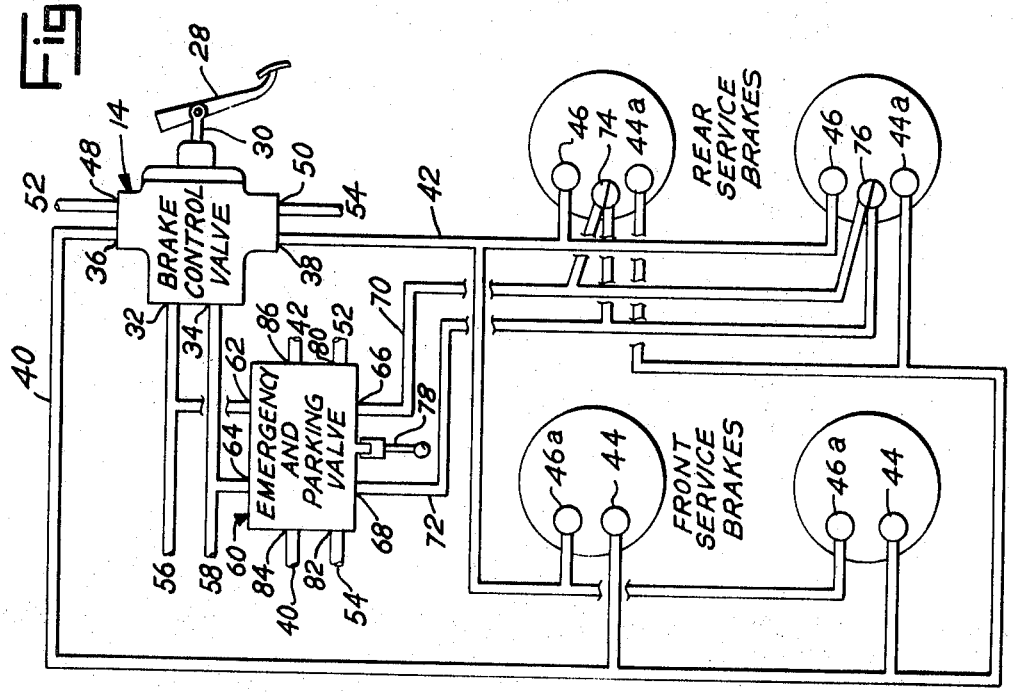
FIG. 2 is a partial diagrammatic illustration of a dual full-power system as shown in FIG. 1, except the brakes are split half axle by half axle.

FIG. 2 which does not show the reservoirs 16 and 18, the engine-driven pumps 20 and 22, and the accumulators 24 and 26 is a different braking arrangement from FIG. 1. However, like numerals used in FIG. 1 will also be used in FIG. 2 whenever possible. The split brake control valve 14 which receives pressurized fluid at pressure ports 32 and 34 through conduits 56 and 58, respectively, is actuated by brake pedal 28 and plunger 30. Upon applying the brake pedal 28, pressurized fluid at pressure ports 32 and 34 is communicated to brake ports 36 and 38, respectively. Thereupon the pressurized fluid is delivered through brake conduits 40 and 42 to the front service brakes 44 and 46a and to the rear service brakes 46 and 44a in a split half axle by half-axle arrangement. Therefore, if pressure is lost in either the front service brakes 44 and 46a or the rear service brakes 46 and 44a, the vehicle will still have braking capabilities at each wheel. Upon release of brake pedal 28, communication between pressure port 32 and 34 and brake port 36 and 38 is terminated and communication with return port 48 and 50 is established, respectively, whereby the pressurized fluid in brake conduits 40 and 42 is returned to reservoirs 16 and 18 by conduits 52 and 54, respectively. Pressurized fluid from pressure conduits 56 and 58 is received at pressure ports 62 and 64, respectively, in the emergency and parking brake valve 60. During operation of the vehicle, pressure port 62 and 64 is in communication with spring brake port 66 and 68, respectively, whereby the spring brake 74 and 76 is held off. Upon application of the parking brake lever 78, communication between pressure ports 62 and 64 and spring brake ports 66 and 68, respectively, is terminated, and communication between spring brake ports 66 and 68 and return ports 80 and 82 is established. Thereby the pressurized fluid used to hold off spring brake 74 and 76 is returned to reservoir 16 and 18 through conduits 52 and 54, respectively.

Upon application of the brake pedal 28, if the pressure differential exists between brake conduit 42 and brake conduit 40 the pressure differential realized at service brake port 84 and service brake port 86 will actuate the emergency and parking brake valve. Thereupon the spring brakes 74 and 76 will be applied in proportion to the pressure differential. The emergency port of the emergency and parking brake valve 60 can be from a greater pressure in brake conduit 42 or a greater pressure in brake conduit 40 according to the connections at brake service port 82 or brake service port 86. Also, the spring brake 74 and 76 may be located on the same wheels as the rear service brakes 46 or the front service brakes 44. Each spring brake 74 and 76 is in communication with both spring brake port 66 and 68 through spring brake conduit 70 and 72, respectively.

Referring now to FIG. 3, a complete description of the drawing will not be given because the same parts common to both FIGS. 1 and 2 will also be represented by like numerals in FIG. 3. FIG. 3, however, is different because the brakes 44 and 46 are split in a half axle by one and one-half axle arrangement. Therefore, upon application of the brake pedal 28, the part of the split brake control valve 14 connected through brake conduit 40 to front service brakes 44 and 44a will be controlled by one-half of the split brake control valve 14. The other part of the split brake control valve 14 will control the rear service brakes 46. Because this type of system is normally used on large trucks, with the majority of the braking force being applied to the rear service brakes, the spring brake 74 and 76 should be located on the same wheels as the rear service brakes.

The emergency and parking brake valve 60 operates in the same manner as described in conjunction with FIGS. 1 and 2. It should be realized that the valve 60 can be operated as either emergency brake valve or as a parking brake valve. Also, the spring brakes 74 and 76 may be of modulated or unmodulated type. Spring brakes 74 and 76 may be connected to any active wheel on any axle of the vehicle, and the emergency and parking valve may have one, two or any number of communicating conduits connected to the spring brakes. The split emergency and parking brake valve 60, as shown in FIGS. 1, 2 and 3, was chosen because of the safety features inherent in a dual system.

Figure 4:
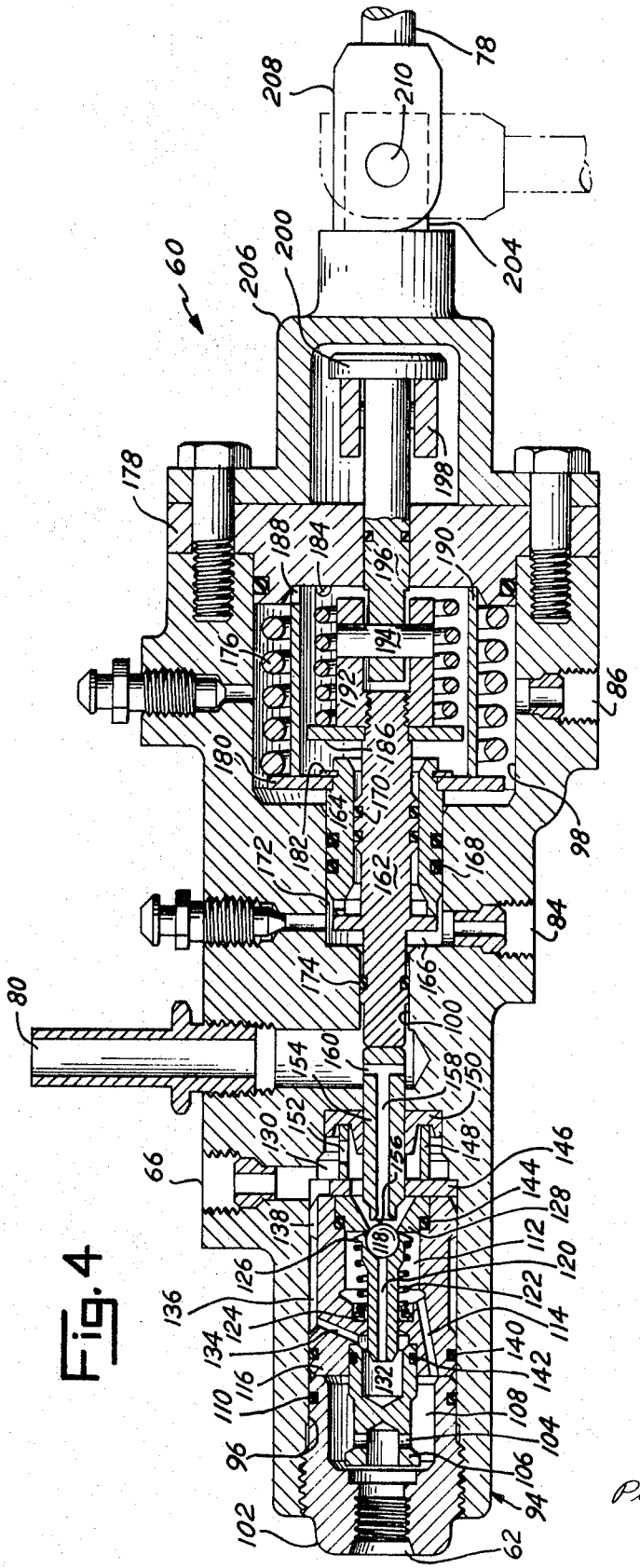
FIG. 4 is a lengthwise cross-sectional view of one valve in the split emergency and parking valve.

The emergency and parking brake valve as functionally described in conjunction with FIGS. 1, 2 and 3 will be described in more detail in conjunction with FIGS. 4, 5 and 6. Referring first to FIG. 4, there is a cross-sectional view of one-half of the split emergency and parking brake valve 60. The emergency and parking brake valve 60 consists of a housing 94 with a front chamber 96 and a rear chamber 98 with a communicating passage 100 therebetween. The front chamber 96 is in communication with pressure port 62 located in retaining plug 102 and spring brake port 66. The pressurized fluid that enters pressure port 62 passes through communicating passage 104 of entrance block 106. Seals 110 prevent the pressurized fluid from escaping around retaining plug 102. The pressurized fluid realized in chamber 108 is also realized in poppet chamber 112 through radial passages 114 in pressure cylinder 116. A poppet 118 is retained in pressure cylinder 116 by means of sleeve 120. A spring 122 acting against seal 124 and sleeve flange 126 retains poppet 118 against seat 128. On the right side of poppet 118 is brake chamber 130 which communicate with spring brake port 66. Brake chamber 130 is also in communication with sleeve chamber 132 through passage 134, cutout 136 and notch 138. Because a pressure difference may be realized between brake chamber 130 and poppet chamber 112, the respective pressures are maintained by pressure cylinder seal 140, entrance block seal 142, valve seat seal 144 and seal 124. Upon tightening retaining plug 102 into position, pressure cylinder 116 is forced against retainer 146. Also retainer 146 is forced against sleeve 148 which firmly seats shaft seal 150. Sleeve 148 has holes 152 for communicating pressurized fluid to spring brake port 66.

Slidable shaft 154 has a seat 156 for moving poppet 118 away from valve seat 128. In the configuration as shown, brake chamber 130 is in communication with return port 80 through slidable shaft passage 158 and radial bore 160. Upon seating of slidable shaft seat 156 against poppet 118, communication between brake chamber 130 and return port 80 is terminated.

Abutting piston 162, which extends through communicating passage 100 into rear chamber 98, is in an abutting relationship with slidable shaft 154. Radially disposed about abutting piston 162 is concentric piston 164. A piston chamber 166 is in communication with front service brake port 84. Any pressure in piston chamber 166 acts against concentric piston seals 168 and abutting piston seals 170 through concentric piston passage 172. Forward seals 174 prevent pressurized fluid in piston chamber 166 from escaping to return port 80.

Rear chamber 98 is in direct communication with rear service brake port 86. Any pressure realized in rear chamber 98 is applied against concentric piston 164 and abutting piston 162 to counteract any pressure realized in piston chamber 166. Concentric spring 176 which is compressed between end block 178 and retainer 180 tends to force the concentric piston 164 towards the left. Clip 182 holds the retainer 180 into place on the concentric piston 164. Abutting spring 184 is compressed between end block 178 and retainer 186 to force the abutting piston towards the left. Any pressure in rear chamber 89 acting against concentric piston 164 also acts against abutting piston 162 by means of cutout 188 in sleeve 190. Therefore, if a greater pressure is realized at front service brake port 84 than at rear service brake port 86, the movement of the concentric piston 164 to the right will be opposed by concentric spring 176 and the movement of abutting shaft 162 to the right will be opposed by abutting spring 184.

The rearward portion of abutting piston 162 is threadedly connected to a pin cylinder 192 which contains pin 194 connected to end shaft 196 that extends through end block 178. The right end of end shaft 196 contains a cap 200 which abuts yoke 198. The yoke 198 is pinned by yoke pin 202 (shown in FIG. 5) to parking brake shaft 204 which extends through end cap 206. Parking brake shaft 204 is pinned to camming surface 208 by means of parking pin 210. The camming surface 208 is attached to a parking brake lever 78 which contains a handgrip 214 (shown in FIG. 6) on the opposite end of the parking brake lever 78.

Referring now to FIG. 5, there is shown the top view of the emergency and parking brake valve 60 of FIG. 4 with a cutaway portion to better illustrate the yoke arrangement. Note that each half of the split emergency and parking brake valve 60 is entirely separate from the other half. Even the pressure differential chamber is separate for each half. Only at the yoke 198 do the separate halves of the split system come together to provide a means of operation from a single parking brake lever 78. Caps 200 on end shafts 196 and 226 operate against the opposite ends of the yoke 198. The center of the yoke 198 is pivotally connected by yoke pin 202 to parking brake shaft 204. The parking brake shaft 204 is connected through parking brake pin 210 and camming surface 208 to parking brake lever 78.

The pressure ports 62 and 64 are shown at the left end of housing 94. Spring brake port 66 and 68 and return port 80 and 82 are on the same axis as pressure port 62 and 64, respectively. Also shown in FIG. 5 is bleed valve 216 and 218 for removing air from piston chamber 166 upon initially installing the emergency and parking brake valve 60. Bleed valves 220 and 222 remove air from rear chamber 98 upon initially installing the emergency and parking brake valve 60. In the cross-sectional area 224 the end cap 206 and the camming surface 208 is cutaway to better visualize the yoke 198 and pin 210 connection. When the parking brake lever 78 is moved in the horizontal direction, the yoke 198 acts against cap 200 of end shaft 196 and end shaft 226. Movement of the parking brake lever 78 will turn the camming surface 208 which either acts against end cap 206 to pull the yoke 198 towards the right or allow the yoke to move towards the left.

Figure 6:
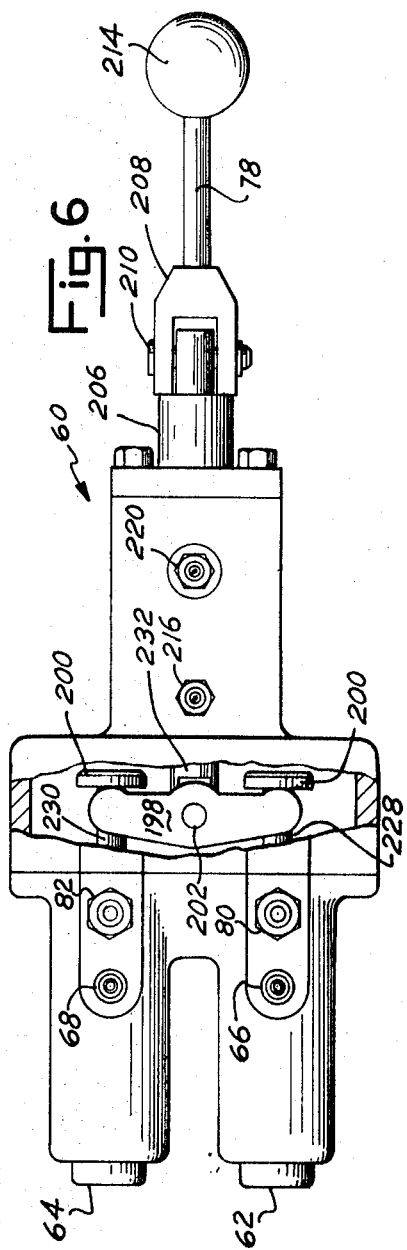
FIG. 6, shown in half-scale, is an alternate yoke arrangement to FIG. 4 wherein only one pressure differential chamber is needed.

An alternate arrangement for yoke 198 is shown in FIG. 6 wherein only one pressure differential chamber is required. The yoke 198 in FIG. 6 would be located somewhere between forward seals 174 and the left end of abutting piston 162 shown in FIG. 4. Abutting shafts 230 and 228 are connected to caps 200. The caps 200 press against the opposite ends of yoke 198 which is pivotally connected by yoke pin 202 to piston 232. Piston 232 operates in the same manner as abutting piston 162 in FIG. 4 except the abutting relationship is furnished through yoke 198 and abutting shafts 228 and 230. All other parts of FIG. 6 are shown in FIGS. 4 and 5 and will be given corresponding numerical references.

OPERATION

The inversion in parking brake valve 60 can be operated by the parking brake lever 78. The camming surface 208 is connected through yoke 198 on end shaft 196 to abutting piston 162. When the parking brake lever 78 is in the horizontal direction, as shown in FIG. 4, the abutting piston 162 and the concentric piston 164 is pulled to the right. Pressurized fluid in brake chamber 130 forces slidable shaft 154 to the right in abutting relation with abutting piston 162. Therefore, seat 156 is unseated from poppet 118 to allow pressurized fluid in brake chamber 130 to pass through slidable shaft passage 158 and radial bore 160 to return port 80. By removing the pressure at spring brake port 66, the holdoff pressure of spring brake 74 and 76 is also removed therefore causing the application of the spring brakes. By pivoting the parking brake lever 78 into the vertical position (shown in dotted lines in FIG. 4), the abutting piston 162 and the concentric piston 164 is forced to the left by abutting spring 184 and concentric spring 176, respectively. The movement of abutting piston 162 to the left also moves slidable shaft 154 to the left. Movement of slidable shaft 154 to the left will cause a seating of seat 156 against poppet 118 and, subsequently, unseating of poppet 118 from seat 128. Thereupon, communication between brake chamber 130 and return port 80 is terminated and communication between poppet chamber 112 and brake chamber 130 is established. The pressurized fluid in brake chamber 130 is communicated through spring brake port 66 to spring brakes 74 and 76. Because the sleeve chamber 132 and the area of sleeve 120 at seal 124 is identical to the pressure in brake chamber 130 and the area of poppet 118 seated on seat 128, the poppet 118 may be seated and unseated very easily. Only the light spring 122 provides a retaining force to move the poppet 118 towards the right. Therefore, a very small force can control the flow of a high-pressure fluid from poppet chamber 112.

If upon application of the brakes there is a pressure differential wherein the pressure at the front service brake port 84 is greater than the pressure at the rear service brake port 86, it will result in a greater pressure in piston chamber 166 than in rear chamber 98. If the pressure is only slightly greater, concentric piston 164 will move against concentric spring 176 to the right. If the pressure differential exceeds a predetermined amount, concentric piston 164 will move to the right until retainer 180 abuts the left end of sleeve 190 and the right end of sleeve 190 abuts end block 178. Thereupon, any further increase in pressure in piston chamber 166 will cause a movement of abutting piston 162 to the right. Because the area of concentric piston 164 at concentric piston seals 168 is larger than the area of abutting piston 162 at abutting piston seals 170, and the concentric spring 176 and abutting spring 184 are properly selected, any small pressure differential below the predetermined amount will be largely reflected in movement of the concentric piston 164 and substantially no movement of abutting piston 162. Therefore, if the pressure differential is greater than the predetermined amount, the abutting piston 162 will move to the right. Pressure in brake chamber 130 will cause slidable shaft 154 to follow abutting piston 162 to the right. A movement of slidable shaft 154 to the right will cause a seating of poppet 118 against seat 128 and a subsequent unseating of poppet 118 from seat 156 thereupon allowing pressurized fluid in brake chamber 130 to flow through slidable shaft passage 158 and out return port 80. The reduction of pressure in brake chamber 130 will reduce the force-pushing slidable shaft 154 to the right. A reduction in the force exerted by slidable shaft 154 on abutting shaft 162 will result in leftward movement of both the slidable shaft 154 and abutting shaft 162. Consequently, seat 156 will again seat against poppet 118 to hold some reduced pressure in brake chamber 130. As the pressure differential varies, the seat 156 will seat or unseat from poppet 118 to give a modulated pressure at brake chamber 130 and, therefore, a modulated pressure at spring brakes 74 and 76. The abutting relationship between slidable shaft 154 and abutting piston 162 helps give a smooth variation of pressure at return port 80 by a gradual seating and unseating of seat 156 from poppet 118.

We claim:
1. In an automotive vehicle with hydraulic brakes, a full-power braking system with independent first and second braking subsystems, each subsystem having a source of pressurized fluid supplied to a control valve, said full-power braking system comprising:
   means for actuating said control valve to apply said first and second braking subsystems by supplying said pressurized fluid in said first and second braking subsystems to the hydraulic brakes in said vehicle;
   spring brake means for auxiliary braking;
   auxiliary valve means which provide two independent means for holding off said spring brake means, said auxiliary valve means being actuated to release said spring brake means by one of two actuation means, the first actuation means being an external force and the second actuation means being a pressure differential between the pressurized fluid supplied to said hydraulic brakes in said first braking subsystem and the pressurized fluid supplied to said hydraulic brakes in said second braking subsystem.

2. A full-power braking system, as set forth in claim 1, wherein:
   said hydraulic brakes are split half axle by half axle with each braking subsystem providing braking means to each wheel of said vehicle; and
   said spring brake means is located on the wheels of a single axle of said vehicle.

3. A full-power braking system, as set forth in claim 1, wherein:

said hydraulic brakes are split half axle by one and one-half axle, first axle and half the braking on a second axle, said second braking subsystem providing the other half of the braking on said second axle, said spring brake means being on said second axle for auxiliary braking.

4. A full-power braking system, as set forth in claim 1, comprising:
parking brake means which provides said external force;
emergency braking means wherein said spring brake means are released if said pressure differential exceeds a predetermined amount; and
low-pressure indicator means for detecting a low pressure in said two independent means for holding off said spring brake means.

5. A full-power braking system, as set forth in claim 4, wherein said external force operates said auxiliary valve means through a yoke arrangement, said auxiliary valve means having two separate valves to provide said two independent means.

6. A full-power braking system, as set forth in claim 4, wherein a yoke arrangement operated by one pressure differential controls two separate valves in said auxiliary valve, said yoke arrangement transmitting said external force to operate said auxiliary valve.

7. In a dual-braking system normally actuated by an external force, said dual-braking system comprising:
first and second reservoir means;
first and second pump means for pressurizing fluid from said first and second reservoir means, respectively;
first and second accumulator means for storing pressurized fluid from said first and second pump means, respectively;
split control valve means being actuated by said external force, a first half of said control valve means supplying pressurized fluid from said first accumulator to a first braking means in response to said external force and returning said pressurized fluid from said first braking means to said first reservoir means when said external force is removed; a second half of said control valve means supplying pressurized fluid from said second accumulator to a second braking means in response to said external force and returning said pressurized fluid from said second braking means to said second reservoir means when said external force is removed;
spring brake means;
auxiliary valve means for providing a first and second means for holding off said spring brake means, the first and second holdoff means being operated by pressurized fluid received from said first and second accumulators, respectively.

8. A dual-braking system, as set forth in claim 7, wherein:
said auxiliary valve means can be operated by one of two means, the first means being a manual force and the second means being a pressure differential where the fluid supplied to said first braking means is at a higher pressure than the fluid supplied to said second braking means; and
said spring brake means operates on the same wheels of an automotive vehicle as said second braking means would normally operate.

9. A dual-braking system, as set forth in claim 8, wherein:
said first braking means includes the front brakes of said automotive vehicle;
said second braking means includes the rear brakes of said automotive vehicle; and
said spring brake means is modulated.

10. A dual-braking system, as set forth in claim 7, is for an automotive vehicle wherein:
said auxiliary valve includes two independent valves;
said first independent valve receives pressurized fluid from said first accumulator to provide said first holdoff means of said spring brake means;
said second independent valve receives pressurized fluid from said second accumulator to provide said second holdoff means of said spring brake means;
said first and second independent valves removing said first and second holdoff means when a parking brake means in said automotive vehicle is actuated.

11. A dual-braking system, as set forth in claim 10, further comprising a pressure indicator to warn against low pressure in said holdoff means, and wherein:
a second means for actuating said auxiliary valve is a pressure differential between said fluid supplied to said first and second braking means; and
said spring brake means is modulated relative to said pressure differential.

* * * * *